United States Patent [19]
Tanji et al.

[11] 3,797,596
[45] Mar. 19, 1974

[54] DIGITAL DISPLAY BODY-WEIGHT METER

[75] Inventors: Mikiharu Tanji, Watarai-gun;
Masanori Yamagiwa, Ise City, both of Japan

[73] Assignee: Ise Electronics Corporation, Ise, Mie Prefecture, Japan

[22] Filed: June 28, 1973

[21] Appl. No.: 374,334

[30] Foreign Application Priority Data
June 30, 1972 Japan.......................... 47-77463[U]
June 30, 1972 Japan.......................... 47-77464[U]
June 30, 1972 Japan.......................... 47-77465[U]
June 30, 1972 Japan.......................... 47-77466[U]
June 30, 1972 Japan.......................... 47-77467[U]
June 30, 1972 Japan.......................... 47-77470[U]

[52] U.S. Cl............................ 177/210, 177/DIG. 3
[51] Int. Cl............................................. G01g 3/14
[58] Field of Search........... 177/210, DIG. 1, DIG. 3

[56] References Cited
UNITED STATES PATENTS
2,961,647  11/1960  Dzaack .......................... 177/DIG. 3
3,203,495  8/1965  Lindberg et al. .............. 177/DIG. 3

*Primary Examiner*—George H. Miller, Jr.
*Attorney, Agent, or Firm*—Chittick, Thompson & Pfund

[57] ABSTRACT

A digital display body-weight meter includes a positioning means to bring a code disc having a logic code arrangement to standstill at the termination of its rotation according to the descent of a footstool such that a detecting means to detect a logic code is located at the center of one of a plurality of logic codes, whereby reliable measurement signal may be obtained from the detecting means. It also includes means to bring the detecting means into contact with the logic code arrangement on the code disc after the termination of the rotation of the disc, whereby wear of brush and conductor can be eliminated and also good contact therebetween and reliable read-out of signal may be ensured.

7 Claims, 12 Drawing Figures

FIG. 1
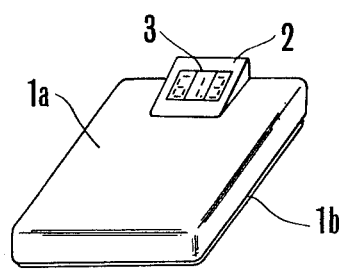
FIG. 2
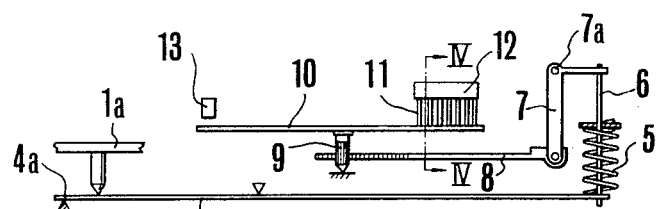
FIG. 4
FIG. 3
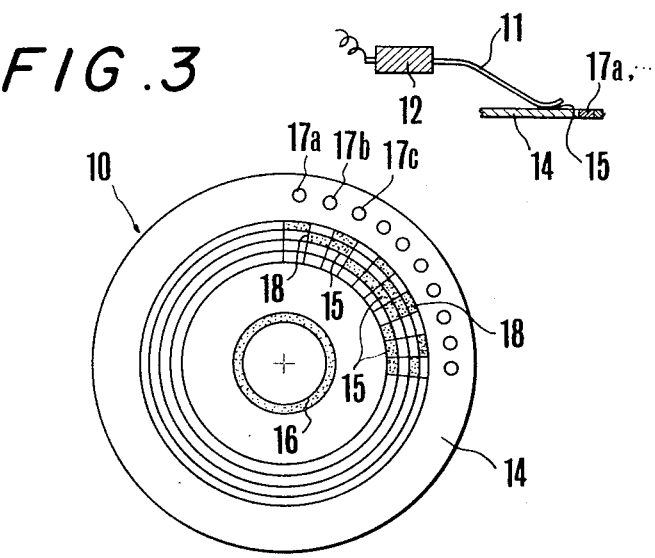

3,797,596

DIGITAL DISPLAY BODY-WEIGHT METER

BACKGROUND OF THE INVENTION

This invention relates to body-weight meters and, more particularly, to a digital display body-weight meter using a code disc rotated in proportion to the body weight being measured.

In the prior-art body-weight meter of this type, the amount of descent of a footstool that results when a person rides thereon is converted into a corresponding extent of rotation of the code disc, and a corresponding code is detected by brush means as an electrical signal, which is digitally displayed on a numeral display tube.

In the body-weight meter of this type, however, the brush means is always urged against the code disc, that is, it is in frictional contact with the disc when the disc is rotating. Therefore, the brush and the conductor on the code disc are subject to wear, and also contact failure is likely to result. Further, the greater the load due to wear, the greater the corresponding error.

In a further aspect, if the brush means is positioned on a borderline between adjacent conductor logics of the code at the termination of the rotation of the disc, the signal read out from the brush is unreliable and prone to error, resulting in the display of an erroneous measurement.

SUMMARY OF THE INVENTION

An object of the present invention, accordingly, is to provide a body-weight meter, which is free from wear of brush means and conductor on the code disc and contact failure between them at the time of the measurement.

Another object of the invention is to provide a body-weight meter, which ensures reliable measurement signal to be read out from the brush.

The invention features a digital display body-weight meter, which comprises a footstool, a code disc having a circumferential arrangement of a plurality of electrical conductor logic codes and adapted to be rotated according to the extent of descent of a footstool that results when a body to be measured rides thereon, a detecting means to detect an electrial conductor logic code corresponding to the descent of the footstool, a means to bring the detecting means into contact with the conductor code arrangement on the code disc after the termination of the rotation of the disc, and a display section for digitally displaying the output of the detecting means.

The invention also features a digital display body-weight meter, which further comprises means to bring the code disc to standstill at the termination of its rotation such that the detecting means does not stride between adjacent conductor codes but does face only one conductor code.

BRIEF DESCRIPTION OF THE DRAWINGS

The above and other objects, features and advantages of the invention will become more apparent from the following description when the same is read in connection with the accompanying drawings, in which:

FIG. 1 is a perspective view of a typical digital display body-weight meter;

FIG. 2 is a fragmentary side view showing the inside mechanism of a digital display body-weight meter embodying the invention;

FIG. 3 is a plan view, to an enlarged scale, showing the code disc in the embodiment of FIG. 2;

FIG. 4 is a fragmentary sectional view taken along line II — II in FIG. 2;

DETAILED DESCRIPTION OF THE PREFERRED EMBODIMENTS

Figure 5:
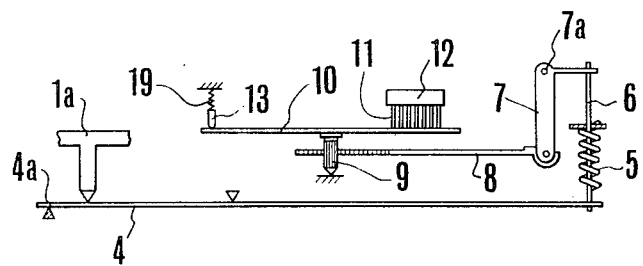
FIG. 5 is a view similar to FIG. 2 but showing a different embodiment of the invention.

FIG. 1 shows a typical digital display body-weight meter. Reference symbols 1a and 1b respectively designate a footstool and a base frame, and numeral 2 designates a display section having a numerical display tube 3.

In this meter, the extent of descent of the foot-stool 1a due to a body-weight thereon is converted through an electric converting mechanism into a corresponding electric signal, from which the weight is displayed on the numerical display tube 3 on the digital display section 2.

FIG. 2 shows a side view of the essential inside mechanism of a digital display body-weight meter embodying the invention. In the Figure, reference numeral 4 designates a lever pivotable about a fulcrum 4a, numeral 5 a spring, numeral 6 a pin, numeral 7 a bellcrank pivoted at 7a, numeral 8 a rack linked at one end to the bellcrank 7, numeral 9 a pinion meshing with the rack 8, numeral 10 a code disc secured to the pinion 9, numeral 11 a plurality of code detection brushes for detecting a particular code on the code disc, numeral 12 a brush support supporting the brushes 11, and numeral 13 a positioning member which is a permanent magnet.

FIG. 3 shows the code disc 10 in detail. It consists of a disc member 14 of an insulating material. The disc member 14 is provided on the upper side with a circumferential electrical conductor logic code arrangement 15 and a grounding conductor 16 concentric therewith. It is also provided with magnetic material pieces 17a, 17b, 17c, . . . , which are circumferentially spaced, each being located adjacent a corresponding conductor logic code of the arrangement 15 between adjacent borderlines 18.

The operation of the above construction will now be described. When a person rides on the footstool 1a of the body-weight meter, the footstool 1a is lowered due to his weight, causing the rotation of the lever 4 about the fulcrum point 4a in the clockwise direction in FIG. 2 against the spring force of the spring 5. The rotation of the lever 4 is transmitted through the pin 6 to the bellcrank 7, causing the rotation of the bellcrank 7 about the support pin 7a thereof in the clockwise direction, thus driving the rack 8 in the leftward direction. As a result, the code disc 10 is rotated through the pinion 9 to an extent corresponding to the weight borne by the footstool 1a.

At this time, if the code disc 10 is about to come to standstill with the brushes 11 positioned on a borderline 18 between adjacent logic codes, one of the magnetic material pieces 17a, 17b, 17c, . . . corresponding to either one of the afore-mentioned adjacent logic codes is attracted by the permanent magnet 13, so that the code disc 10 may be slightly rotated to position the brushes 11 on a central portion of either one of the adjacent logic codes. Thus, a reliable output signal can be taken out from the brushes 11. The signal thus derived is decoded and displayed on the numerical display tube 3, so that it is possible to obtain reliable digital display of the measurement of the weight.

While in the preceding embodiment a single permanent magnet has been used, it is of course possible to provide a plurality of permanent magnets in the same positional relation. Further, it is possible to provide a plurality of permanent magnets in place of the magnetic material pieces while providing a magnetic material piece in place of the permanent magnet. Furthermore, it is of course possible to replace the permanent magnet with an electromagnet.

Moreover, the brushes used in the preceding embodiment for reading out the logic code on the code disc is by no means limitative, but any other suitable logic code detecting means may be employed as well.

FIG. 5 shows a second embodiment of the invention. In the Figure, numerals 4 to 12 designate the same parts as those of like numerals in FIG. 2. Numeral 13 designates a positioning member downwardly biased by a spring 19.

Figure 6:
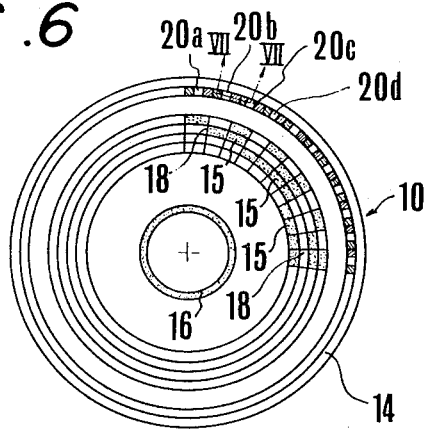
FIG. 6 is a plan view, to an enlarged scale, showing the code disc in the embodiment of FIG. 4.

FIG. 6 shows the code disc 10 of this embodiment in detail. It consists of a disc member 14 of an insulating material. The disc member 14 is provided on the upper side with a circumferential electrical conductor logic code arrangement 15 and a grounding conductor 16 concentric therewith. It is also provided with recesses 20a, 20b, 20c, . . . , which are circumferentially spaced, each being located adjacent a corresponding conductor logic code in the logic code arrangement 15 between adjacent borderlines 18.

Figure 7:
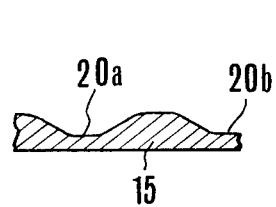
FIG. 7 is a sectional view, to an enlarged scale, taken along line V — V in FIG. 5.

FIG. 7 shows a sectional profile of a typical recess 20a.

Figure 8:
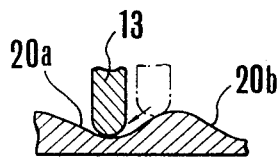
FIG. 8 shows the state of the engagement of a positioning member in a recess in the code disc.

The operation of this embodiment is similar to that of the preceding embodiment. In this embodiment, however, if the code disc 10 is about to come to standstill with the brushes 11 at a position on a borderline 18 between adjacent logic codes, the positioning member 13 is caused to slip along one inclined surface of one of the recesses 20a, 20b, 20c, . . . corresponding to either one of the aforementioned adjacent logic codes as shown in FIG. 8, so that the code disc 10 may be slightly rotated to position the brushes 11 on a central portion of either one of the adjacent logic codes. Thus, a reliable output signal can be taken out from the brushes 11. The signal thus taken out is decoded and displayed on the numerical display tube 3, so that it is possible to obtain reliable digital display of the measurement of the weight.

While in the above embodiment a single positioning member has been used, it is of course possible to provide a plurality of positioning members in the same positional relation. Also, the brushes used for reading out the logic on the code disc is again by no means limitative, but any other suitable logic detecting means may be used as well.

Figure 9:
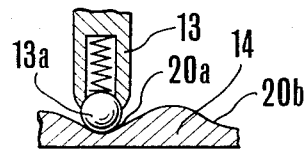
FIG. 9 is a view similar to FIG. 7 but showing a modified positioning member.

FIG. 9 shows a modification of the positioning member in the preceding embodiment. This modified positioning member 13 is provided at its free end with a ball 13a. The ball 13a can roll on the inclined surface of the recesses 20a, 20b, 20c, . . . , so that smoother positioning of the code disc 10, that is, the positioning of a logic conductor code with respect to the brushes, may be ensured.

In the preceding embodiments, the brushes are always urged against the code disc. This means that the brushes and the conductor on the code disc are subject to wear and that contact failure is likely to result as has been mentioned earlier.

Figure 10:
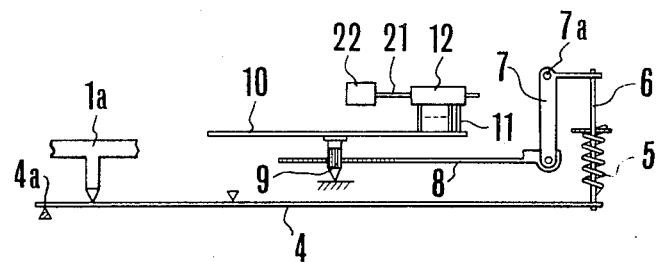
FIG. 10 is a fragmentary side view showing a further embodiment of the invention.

FIG. 10 shows a modification of the previous embodiment of FIG. 2 or 5. In the Figure, the same reference numerals as those in FIG. 2 or 5 designate like parts. Also, although not shown in the Figure, a positioning means such as the permanent magnet 13 in the embodiment of FIG. 2 or the positioning member 13 biased with the spring 19 in the embodiment of FIG. 5 may be provided. In this embodiment, the brush support 12 is rotatably supported on a shaft 21, which is driven by a rotary solenoid 22 converting a linear attraction of an electromagnet into the rotation of the shaft 21 by a fixed angle. The rotaty solenoid 22 is energized a predetermined delay time after the closure of a switch not shown upon the descent of the footstool or upon detection of the stoppage of the rotation of the code disc through a tachogenerator.

Figure 11:
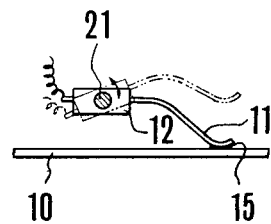
FIG. 11 is a fragmentary view, to an enlarged scale, showing the operation of the brush support.

When the rotaty solenoid 22 is energized, the shaft 21 is rotated, causing the rotation of the brush support 12 from the position of dashed line to the position of solid line in FIG. 11. As a result, the brushes 11 are forced into contact with the conductor on the code disc 10 to detect the logic code as electric signal. The electric signal thus derived is decoded and displayed on the numerical display tube.

It will be seen that in this embodiment the brushes are brought into contact with the conductor after the code disc is stopped, so that wear of the brushes and conductor can be eliminated and good contact and reliable read-out may be ensured.

Figure 12:
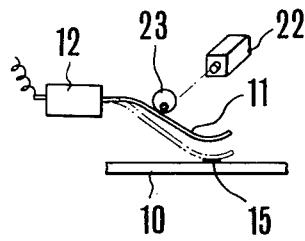
FIG. 12 is a view similar to FIG. 10 but showing a modification of the arrangement of FIG. 10.

FIG. 12 shows a modification of the preceding embodiment. In this modification, the brush support 12 is fixed in position, and the brushes 11 are adapted to be urged against the code disc 10 by a cam 23, which is driven by a rotary solenoid 22 converting a linear attraction of an electromagnet into the rotation of the cam 23 by a fixed angle. The rotary solenoid 22 is energized a predetermined delay time after the closure of a switch not shown upon the descent of the footstool or upon detection of the stoppage of the rotation of the code disc through a tachogenerator.

When the rotary solenoid 22 is energized, the cam 23 is rotated to cause the displacement of the brushes 11 from the position of solid line to the position of dashed line into contact with the conductor on the code disc 10 for the detection of the logic code as electric signal.

Thus, the same effects as in the preceding embodiment may be obtained. In addition, leads leading from the brushes will not be subject to any bending stress, so that their service life may be extended.

As has been described in the foregoing, with the digital display body-weight meter according to the invention reliable positioning of a logic code on the code disc with respect to the brushes may be ensured to obtain reliable measurement signal from the brushes. Also, since the brushes are brought into contact with the conductor after the stoppage of the code disc, wear of the brushes and the conductor can be eliminated and also good contact and reliable read-out of the signal may be ensured.

What is claimed is:

1. A digital display body-weight meter comprising a footstool, a code disc having a circumferential logi code arrangement of a plurality of electrical conductor codes and adapted to be rotated according to the extent of descent of said footstool that results when a body to be measured rides thereon, a detecting means to detect at least one electrical conductor code corresponding to the descent of the footstool, a positioning means to bring the code disc to standstill at the termination of its rotation such that said detecting means is located at the center of one of said electrical conductor codes, and a display section for digitally displaying the output of said detecting means.

2. A digital display body-weight meter according to claim 1, wherein said code disc also has a grounding conductor concentric with said logic code arrangement.

3. A digital display body-weight meter according to claim 1, wherein said detecting means comprises at least one brush capable of being brought into contact with said electrical conductor codes, a rotatable brush support supporting one end of said brush and a rotary solenoid means co-operating with a rotative shaft of said brush support, said brush being brought into contact with said electrical conductor codes only when said rotary solenoid means is energized.

4. A digital display body-weight meter according to claim 1, wherein said detecting means comprises at least one brush capable of being brought into contact with said electrical conductor codes, a brush support supporting one end of said brush, a cam member rotatable and capable of urging said brush and a rotaty solenoid means co-operating with said cam member, said brush being urged by said cam member into contact with said electrical conductor codes only when said rotary solenoid means is energized.

5. A digital display body-weight meter according to claim 1, wherein said positioning means comprises a plurality of magnetic material spaced along the circumference of said code disc and individually located adjacent respective conductor codes between adjacent borderlines between adjacent conductor codes and at least one magnet held at a fixed position and capable of facing said magnetic material pieces.

6. A digital display body-weight meter according to claim 1, wherein said positioning means comprises a plurality of recesses individually formed in said code disc adjacent respective conductor codes between adjacent borderlines between adjacent conductor codes and at least one positioning member capable of facing said recesses and adapted to be urged into engagement in said recesses.

7. A digital display body-weight meter according to claim 6, wherein said at least one positioning member is provided with a rolling member capable of being in rolling contact with said recesses.

* * * * *